United States Patent [19]

Tanoshima et al.

[11] Patent Number: 4,813,007
[45] Date of Patent: Mar. 14, 1989

[54] EXTERNAL MAGNETIC FIELD GENERATING DEVICE

[75] Inventors: Katsuhide Tanoshima; Yasuhiro Suzuki; Shizuo Nagata; Yasuo Shimizu, all of Tokyo, Japan

[73] Assignee: Oki Electric Industry Co., Ltd., Tokyo, Japan

[21] Appl. No.: 153,724

[22] Filed: Feb. 8, 1988

[30] Foreign Application Priority Data

Feb. 13, 1987 [JP] Japan .............................. 62-18893[U]
Mar. 16, 1987 [JP] Japan .............................. 62-37126[U]
May 26, 1987 [JP] Japan .................................. 62-127182

[51] Int. Cl.$^4$ .......................................... G01D 15/00
[52] U.S. Cl. ..................................... 346/74.5; 346/74.2
[58] Field of Search ................. 346/74.5, 74.2, 139 C; 360/111, 122, 125–127; 101/DIG. 5; 400/119; 358/301

[56] References Cited

U.S. PATENT DOCUMENTS 4,414,554 11/1983 Springer ............................. 346/74.5

FOREIGN PATENT DOCUMENTS 187101 8/1986 Japan .................................. 346/74.5
192001 8/1986 Japan .................................. 346/74.5

Primary Examiner—Arthur G. Evans
Attorney, Agent, or Firm—Spencer & Frank

[57] ABSTRACT

An external magnetic field generating device includes a pole piece mounted on a face of a magnetic plate, and a coil which is in contact with the face of the magnetic plate, the coil being wound flatly around the pole piece so that it spreads out radially. The coil generates a magnetic field through the pole piece when an electric current passes through the coil, the pole piece is projectable beyond the face of the coil opposite the magnetic plate.

11 Claims, 10 Drawing Sheets

EXTERNAL MAGNETIC FIELD GENERATING DEVICE

BACKGROUND OF THE INVENTION

This invention relates to an external magnetic field generating device for use in magneto-optic recording.

The magneto-optic system, which is one type of optical disk device capable of erasable recording, uses the following principle: A magnetic film is heated with a laser spot and a magnetic field of several hundred oersteds is applied, magnetizing the magnetic film, when the heat is removed, in the direction of the external magnetic field. If one direction of magnetization signifies "recording" or bit "1", the opposite direction signifies "erasure" or bit "0".

FIG. 1 shows a first example of a conventional external magnetic field generating device for the implementation of the above-mentioned magneto-optic system. In the figure the external magnetic field generating device is comprised of permanent magnet 2 mounted on a magneto-optic disk 1 for recording, and an actuator (for example an actuator using a magnet etc.), not shown, which rotates permanent magnet 2 about axis 3. Permanent magnet 2 is in the form of a rod which elongates in the direction of the radius of the disk 1 and is magnetized N and S in its width direction. The magnetic field component of this magnet which is perpendicular to the disk contributes to the magnetic inversion of the magnetic film of disk 1. In other words, as shown in the figure, by rotating with an actuator permanent magnet 2, on which are arrayed magnetic poles S and N in a direction perpendicular to disk 1, 180° about axis 3, magnetic recording and erasure may be performed.

FIG. 2 shows a second example of a conventional external magnetic field generating device. This external magnetic field generating device is, as shown in the figure, comprised mainly of an electromagnet 4. The electromagnet 4 has an elongated form and is mounted to extend in the direction of the radius of the magneto-optic disk 1 for recording. Protruding teeth 5, 6a and 6b are formed on its bottom face. The coil 7 is wound around the central tooth 5 and the magnetic field is generated by sending an electric current through the coil 7. The magnetic field so generated enters the teeth 6a and 6b, on either side of the central tooth 5, from the central tooth 5 and the component of this magnetic field which is perpendicular to the disk becomes the external magnetic field, performing recording or erasure on the magnetic film. The inversion of the magnetism of the magnetic field is accomplished by reversing the direction in which the electric current is sent.

However, the first and second examples of conventional external magnetic field generating devices described above contain problems, as described below.

In the first example of the external magnetic field generating device, the permanent magnet must be mechanically rotated by some external force, in other words an actuator, when inverting the magnetism of the magnetic field. In order to rotate a magnet which has a large amount of inertia, ten to several hundred milliseconds of operating time is required, giving various limitations to its use.

Also, in the second example, in order to wind the coil 7 of FIG. 1 the requisite number of times the tooth 5 must be high. The teeth 6a and 6b on either side of the tooth 5 are also as high as the tooth 5. Therefore, because of the dimension in the height direction of the teeth, this example has the drawback that the entire external magnetic field generating device becomes large. And this drawback has greatly retarded the miniaturization and thinning of magneto-optic disk devices.

SUMMARY OF THE INVENTION

An object of this invention is to provide an external magnetic field generating device which is small and thin, and possesses outstanding functional characteristics.

According to the invention, there is provided an external magnetic field generating device comprising:
a magnetic plate,
a pole piece mounted on a face of the magnetic plate, and
a coil which is in contact with said face of the magnetic plate, is wound flatly around said pole piece so that it spreads out radially, and generates a magnetic field through said pole piece when an electric current passes through said coil,
wherein said pole piece projects or is capable of projecting from the face of said coil opposite said magnetic plate.

When generating a magnetic field externally with an external magnetic field generating device according to the present invention, the pole piece is first disposed substantially perpendicular to the magnetic plate. The coil is in contact with the magnetic plate and is wound flatly so that it spreads out. The magnetic field generated by the flow of electricity leaks into the atmosphere and from there enters and is closed by the pole piece, which is the center of the coil. For example, when performing magneto-optic recording with the device, perpendicular magnetization may be performed using the perpendicular (to the magnetic disk) component of the leaked magnetic field described above.

Also, when changing the direction of the magnetic field generated, the direction of the electric current flowing through the coil is reversed.

Since the coil is flat and the pole piece projects from the face of the coil, the pole piece alone can be brought into the proximity of the surface of the disk while the flat coil stays out of the window that is provided for the access of the pole piece to the disk surface, and the external magnetic field generating device may be made thin and small.

DETAILED DESCRIPTION OF THE PREFERRED EMBODIMENTS

Figure 1:
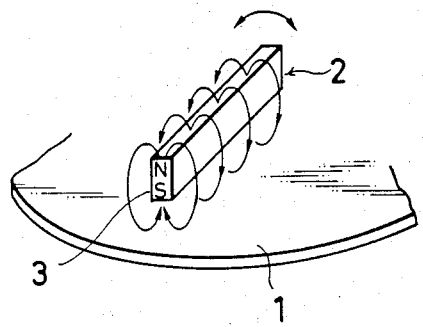
FIG. 1 is a diagram showing a first example of a conventional external magnetic field generating device.
Figure 2:
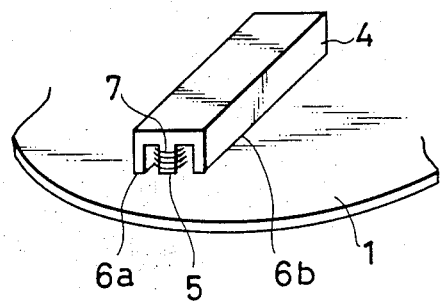
FIG. 2 is a diagram showing a second example of a conventional external magnetic field generating device.
Figure 3:
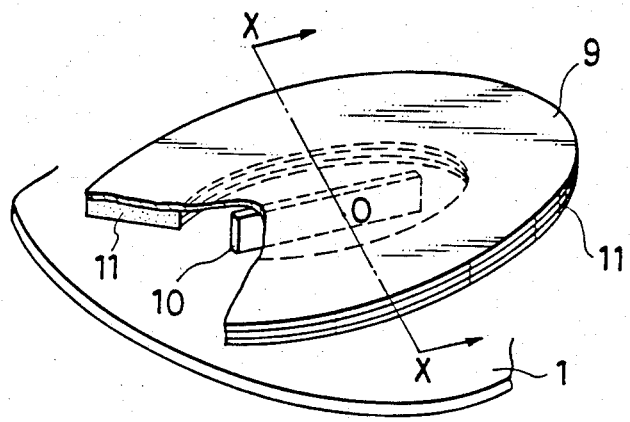
FIG. 3 is a perspective view showing an external magnetic field generating device for use in magneto-optic recording according to an embodiment of the present invention.
Figure 4:
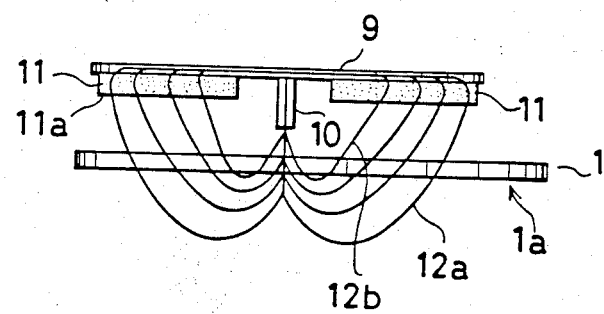
FIG. 4 is a cross sectional view along line X—X in FIG. 3.

FIG. 3 is a perspective view showing the structure of an external magnetic field generating device according to the first embodiment of this invention. FIG. 4 is a cross sectional view taken along the line X—X in FIG. 3.

Figure 5A:
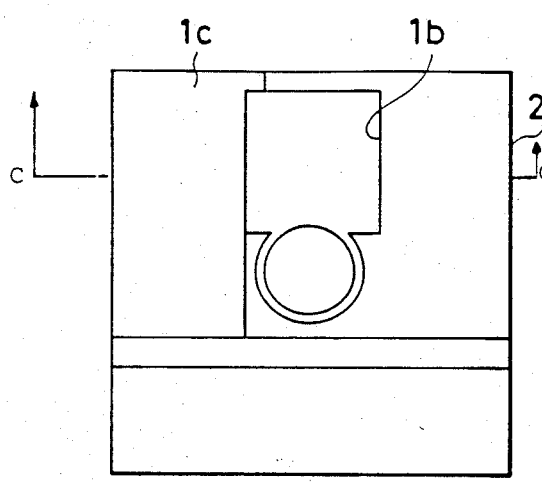
FIGS. 5A and 5B are plan views of a disk cassette in different states.
Figure 5B:
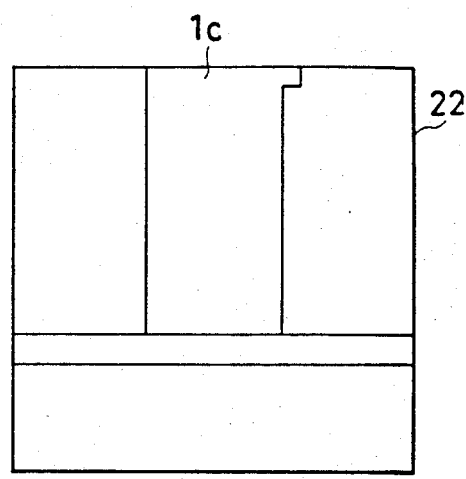
Figure 5C:
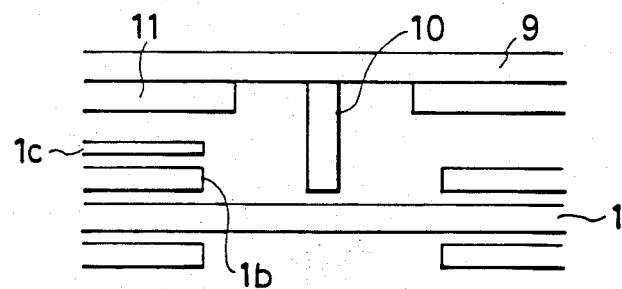
FIG. 5C is a cross sectional view taken along line C—C in FIG. 5A.

In FIG. 3 the external magnetic field generating device is comprised of a substantially flat magnetic plate 9, a pole piece 10 fixed perpendicularly to the bottom face of magnetic plate 9, and a coil 11 centered about pole piece 10 which is in contact with the bottom face of the above mentioned magnetic plate 9 and which is wound flatly and spreading out radially. The pole piece 10 projects below the level of the lower surface 11a of coil 11. This external magnetic field generating device is mounted above the magneto-optic disk 1 for recording. As illustrated in FIGS. 5A, 5B and 5C, the magneto-optic disk 1 is enclosed in a cassette 22 rotatably supporting the disk 1. The cassette 22 is provided with an window 1b which is opened and closed by a shutter 1c. When the shutter 1c is opened, the disk 1 becomes accessible for the external magnetic field generating device, that is, the tip of the projecting pole piece 10 can be brought into in the window 1b in the proximity of the surface of the disk 1. The coil 11 has a dimension larger than the window 1b so that it cannot be brought into the window 1b but is situated outside the window 1b when the tip of pole piece 10 is near the surface of the disk 1.

The following is an explanation of the operation.

As shown in FIG. 4, when electric current is sent through the coil 11, a magnetic field is generated from the coil 11. The magnetic field generated leaks into the atmosphere, passing through the pole piece 10 and the magnetic plate 9, goes to the exterior thereof, penetrating the disk 1 and its recording face 1a, enters the interior of the pole piece 10 through the tip of the pole piece 10, once again penetrating the recording face 1a, and is thereby closed. At this time the components of the magnetic field among those at the tip of pole piece 10 which are perpendicular to the recording face 1a contribute to the inversion of the magnetism of the recording face 1a. The magnetic flux lines 12a and 12b, leaked from the magnetic plate 9 operate as follows. As shown in FIG. 4, the outside magnetic flux line 12a passes through the outer part of the coil 9, and the inside magnetic flux line 12b passes through the inner part of the coil 9.

Figure 6:
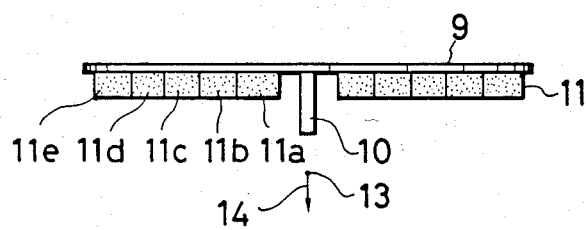
FIG. 6 is a diagram for illustrating the operation of the external magnetic field generating device according to the present invention.
Figure 7:
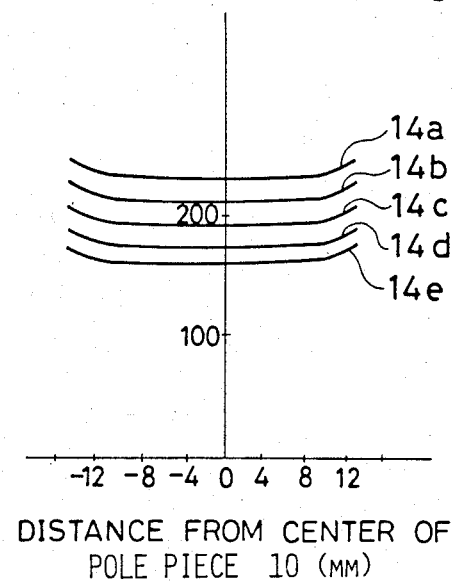
FIG. 7 is a diagram showing the relationship between the intensity of the magnetic field generated and the distance from the magnetic pole piece.

The following is an analysis on the strength of the magnetic field due to respective parts of the coil 9. FIG. 6 is a sectional view of the coil 9 shown in FIG. 3 imaginarily divided in the radial direction from the interior to the exterior into sections 11a, 11b, 11c, . . . 11e. FIG. 7 shows the components of the magnetic field due to respective sections, or, in other words, radial distances from the center of the pole piece 10. The vertical axis shows the magnetic field in gauss, while the horizontal axis shows the above-mentioned distances. The magnetic field components are defined as being, as shown in FIG. 6, the components in the neighborhood 13 of the tip of the pole piece 10 which are horizontal to the pole piece 10 or perpendicular to the face of the magnetic plate 9. In FIG. 7 the strength of the magnetic field component from only coil part 11a is shown by curve 14a, the strength of the magnetic field component 14 from only coil part 11b is shown by curve 14b, and so on up to coil part 11e to which corresponds curve 14e. It is clear from this graph that the magnetic field components 14a, 14b, . . . 14e each created by respective coil parts 11a, 11b, . . . 11e (which are assumed as being separate) have very little difference, whether at the interior (11a) of the coil 11 or at the exterior (11e) of the coil 11, and all contribute to the magnetic field component 14. In other words, the decrease in the magnetic field strength due to flattening of the coil 11 so that it spreads radially has been found to be small. Because of this, according to the present invention, there is no need to wind the coil only in the area close to the pole piece 10 as is conventionally done. Even if the coil is wound flatly and so that it spreads out radially, it displays full performance with almost no decrease in magnetic recording efficiency. Since the coil 11 is flat and thin, the amount of the space required above the disk 1 for the external magnetic field generating device is reduced.

Figure 8A:
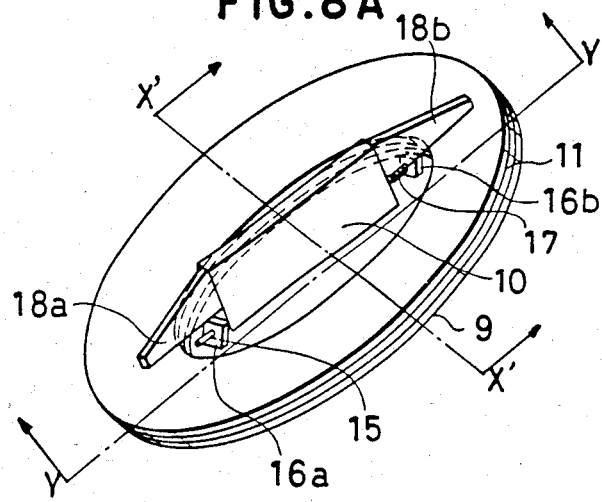
FIGS. 8A, 8B and 8C show a structure of a second embodiment of the present invention.
Figure 8B:
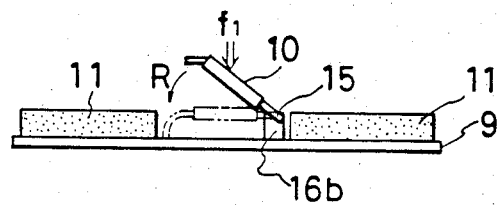
Figure 8C:
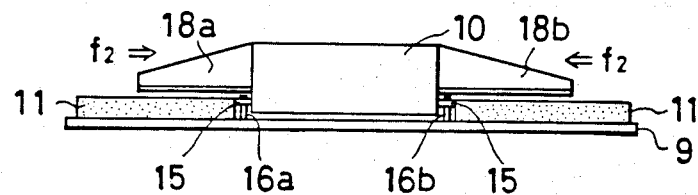

FIGS. 8A, 8B and 8C show a second embodiment of the invention. FIGS. 8B and 8C are sectional views taken respectively along lines X'—X' and Y'—Y' of FIG. 8A. It is featured by a structure for folding the pole piece 10. Reference numbers which are the same as those in the previously referred figures show similar structural elements. A shaft 15 is provided at both ends of the pole piece 10 and is the center of rotation thereof. Brackets 16a and 16b support the shaft 15 so that it rotates freely. The brackets 16a, 16b are formed of a magnetic material to permit passage of magnetic flux that passes through the pole piece 10. A spring 17 holds the pole piece 10 at a specific angle to the face of the magnetic plate 9 and the coil 11. Guide plates are provided on both ends of the pole piece 10. The guide plates 18a, 18b are preferrably of a non-magnetic material. This prevents passage of magnetic flux through them, deviation away from the tip of pole piece.

The following is an explanation of the operation of this embodiment.

First, in the normal state, i.e., the state in which no force is applied to the pole piece 10 and the guide plates 18a and 18b, by the action of the spring 17 the pole piece 10 and the guide plates 18a and 18b are put in an open state at an angle in a range of 45° to 60° relative to the face of the magnetic plate 9 and the coil 11 as shown in (FIG. 8B). When, as shown in FIG. 8B, a force $f_1$ perpendicular to the face of the magnetic plate 9 and the coil 11 is applied, the pole piece 10 rotates in the direction of the arrow R, becomes parallel to the face of the magnetic plate 9 and is folded into the interior of the center of the coil 11. When the force $f_1$ is removed, the pole piece 10 is restored to its original position through the holding force of spring 17.

When, as shown in FIG. 8C, a horizontal force $f_2$ is applied to the either end (i.e., at the oblique area) of the guide plates 18a and 18b in the normal state, the pole piece 10 is rotated and folded in the same way.

Figure 9A:
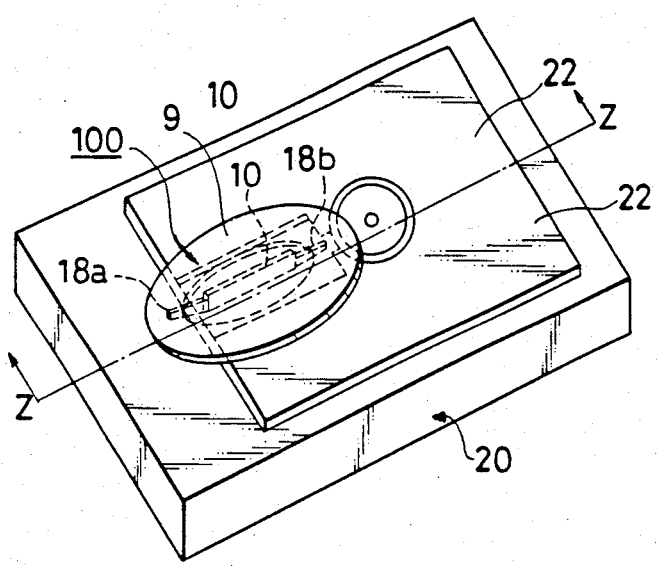
FIGS. 9A, 9B and 9C are diagrams showing examples of applications of the second embodiment of the external magnetic field generating device.
Figure 9B:
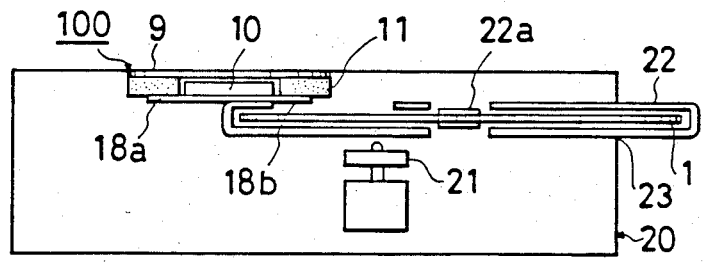
Figure 9C:
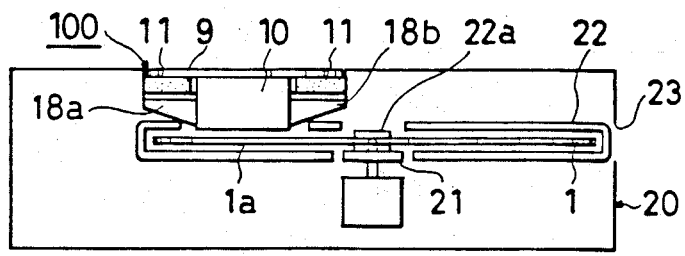

The following is an explanation of an example of applying this embodiment of an external magnetic field generating device 100 to a magneto-optic disk device 20, referring to FIGS. 9A, 9B and 9C. FIG. 9A is a perspective drawing of a magneto-optic disk device with the external magnetic field generating device according to FIGS. 8a-8c installed. FIGS. 9B and 9C are both cross sectional views taken along line Z—Z line of 9A. The external magnetic field generating device 100 is mounted in the upper part of the interior of the magneto-optic disk device 20. A spindle section 21, which rotates and drives the magneto-optic disk 1, is provided in the central part of the device 20. To perform the recording and erasure of data, the disk cassette 22, containing a magneto-optic disk 1, is inserted through an insertion opening 23 in the device 20. The insertion opening 23 is provided in the upper part of the side face of the device 20 so that the disk cassette 22 does not come in contact with the spindle section 21. The tip of the disk cassette 22, when inserted through the insertion opening 23, goes in, it thereby pushes up the pole piece 10 and the guide plates 18a and 18b, touching the tilted end of the entrance side guide plate 18b of the two guide plates 18a and 18b attached to respective sides of the pole piece 10 (FIG. 9B). The pole piece 10 and the guide plates 18a and 18b remain in the pushed up state until the disk cassette 22 is completely inserted. The disk cassette 22 is next dropped down by a structure not shown in the drawings, so that a suction cup 22a and the spindle section 21 are joined. The pole piece 10 and the guide plates 18a and 18b are in abutment with the top of the disk cassette 22 as it is dropped, during which time the pole piece 10 gradually opens up, keeping pace with the drop of the disk cassette 22 and, a little while before the suction cup 22a and the spindle section 21 are fully joined, the pole piece 10 reaches at a 45° to 60° angle relative to the plate 9 and is then completely finished opening. When this happens, the necessary gap is established between the magneto-optic disk 1 and the tip of the pole piece 10, and the strength of the magnetic field necessary for recording appears on the recording face 1a as shown in (FIG. 9C). The ejection operation is as a follows. The disk cassette 22 rises during ejection, but because the pole piece 10 and the guide plates 18a and 18b are attached at a 45° to 60° slant, it is possible to easily fold them up evenly pushing up perpendicularly from the bottom. After that the disk cassette 22 reaches the insertion/ejection opening 23 as during insertion, pushing the pole piece 10 and the guide plates 18a and 18b out of the way.

Therefore, in this embodiment, the disk cassette 22 goes in pushing the pole piece 10 and the guide plates 18a and 18b out of the way. When set in a proper position for recording onto or reading the magneto-optic disk 1, the pole piece 10 is also set. The disk cassette 22 also pushes the pole piece 10 and the guide plates 18a and 18b out of the way during ejection. Thus, the pole piece 10 is set only when needed.

As described in detail above, in this embodiment the structure is such that the pole piece 10 can be folded up with respect to the magnetic plate 9 using the guide plates 18a and 18b, it is possible to easily set the pole piece 9 in position only when it is needed, and to lower the cost of the device.

Figure 8D:
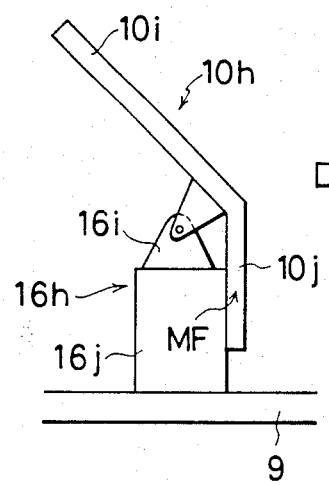
FIGS. 8D and 8E show a modification of a pole piece and bracket.
Figure 8E:
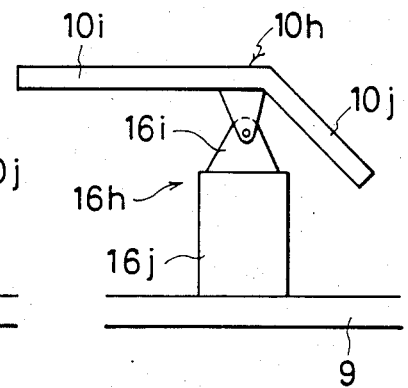

FIGS. 8D and 8E show a modification of the assembly of the pole piece and the bracket. In this modification, a pole piece 10h comprises a first strip 10i and a second strip 10j which are inclined with each other and joined together. The bracket 16h comprises a rod 16j fixed to the magnetic plate 9 and a bearing member 16i. The pole piece 10h is journaled by the bearing member 16i. When the pole piece 10h is in the first position (FIG. 8D) in which the tip of pole piece 10h is near the disk surface, the second strip 10j is in contact with the side surface of the rod 16j to form a path for magnetic flux MF and also to provide a stop for the rotation of the pole piece 10h by the action of the spring 17. During insertion or ejection of the disk 1 in a cassette 22, the pole piece 10h is in the second position in which the tip of the pole piece 10h is away from the disk surface, as shown in FIG. 8E.

Figure 10:
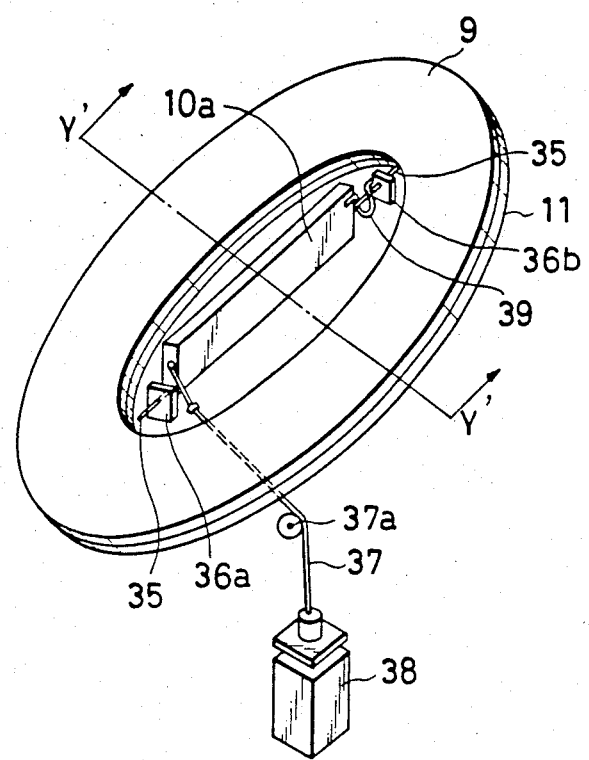
FIG. 10 is a perspective view of an external magnetic field generating device according to a third embodiment of the present invention.
Figure 11:
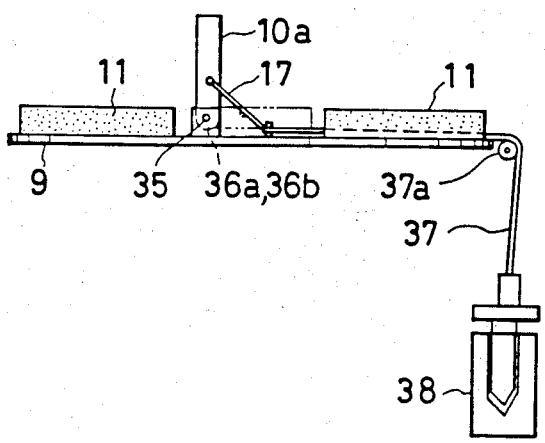
FIG. 11 is a cross sectional view taken along line Y—Y in FIG. 10.

FIG. 10 shows a third embodiment of the invention. This embodiment also has a structure for folding a pole piece 10a. FIG. 11 is a cross sectional view taking along line Y′—Y′ line of FIG. 10. In these drawings the same or corresponding structural elements as found in the previously discussed figures have the same reference numbers applied.

In FIG. 10, a rotary shaft 35 is provided on the upper part of both end faces of the pole piece 10a. The rotary shaft 35 is supported by a bracket 36a and 36b so that rotation of the pole piece 10a is possible. One of the above mentioned end faces of the pole piece 10a is, as shown in FIG. 11, joined to a wire 37 which is disposed at a distance from the rotary axis of the shaft 35. The other end of this wire 37 is joined to a solenoid magnet 38 through a roller 37a. Also, in order to maintain the pole piece 10a perpendicular to the magnetic plate 9 and the flat coil 11, a spring 39 is provided between the shaft 35 and the bracket 36b.

The following is an explanation of the operation of the embodiment of FIGS. 10 and 11.

In the normal state, the pole piece 10a is maintained perpendicular to the magnetic plate 9 and the coil 11 by the spring 39. When the solenoid magnet 38 is excited, the wire 37, attached to the top of the pole piece 10a, is pulled and the pole piece 10a rotates with the rotary axis 35 as its center of rotation. As shown by the dotted outline in FIG. 11, the pole piece 10a becomes parallel to the coil 11. This is the way in which the pole piece 10a performs a folding operation by the excitation of solenoid magnet 38.

Figure 12:
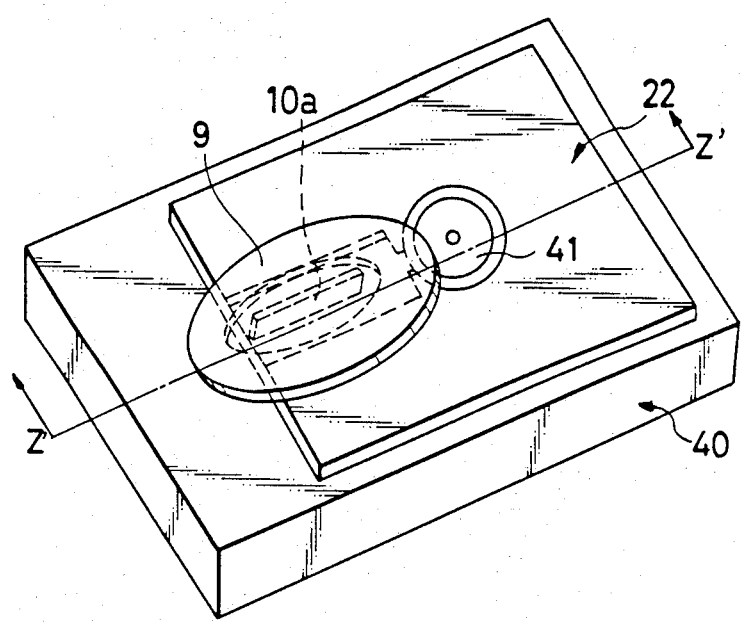
FIG. 12 is a perspective view showing an application of the external magnetic field generating device of the third embodiment to a magneto-optic disk device.
Figure 13:
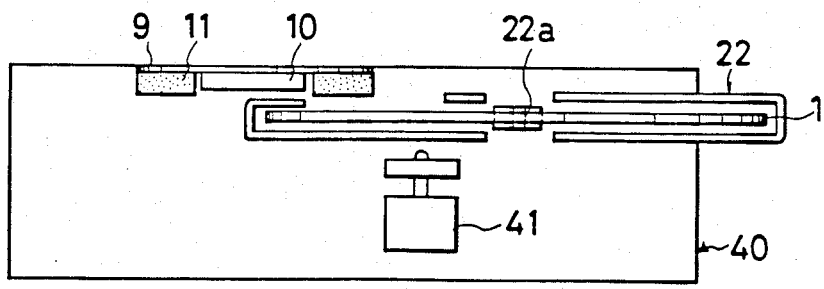
FIGS. 13 and 14 are cross sectional views taken along line Z'—Z' in FIG. 12, respectively showing states of the pole piece during insertion of a disk and after the insertion of the disk.
Figure 14:
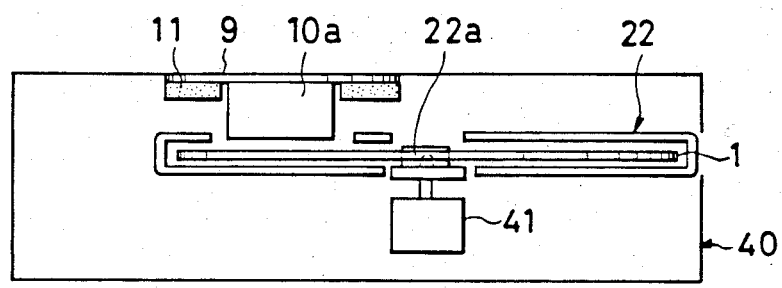

The following is an example of the application of an external magnetic field generation device as set forth in the third embodiment being applied to a magneto-optic disk device, as is shown in FIGS. 12, 13, and 14. FIG. 12 is a perspective view of a magneto-optic recording device in which the external magnetic field generating device is installed. FIGS. 13 and 14 are both cross sectional views taking along line Z′—Z′ line of FIG. 12. In this figures the above-mentioned external magnetic field generating device and a spindle section 41 for driving the magneto-optic disk 1 are provided inside the magneto-optic disk device 40. Furthermore, in order to record and erase data, the disk cassette 22 containing the disk 1 is inserted in an insertion opening as seen in (FIG. 13) of this device 40. When the disk cassette 22 is inserted, pole piece 10 is folded up by movement of the wire 37 due to the excitation of the solenoid magnet 38 so that the disk cassette 22 does not come in contact with the pole piece 10a or the spindle section 41. When the disk cassette 22 is inserted even farther it is dropped by a structure not shown here. The suction cup 22a of the center hole of the disk 1 is then fitted onto the protruding part of the spindle section 41. This completes the insertion of the disk cassette 22.

When recording or erasing the magnetic disk 1 after it has been inserted, the excitation of the solenoid magnet 18 is relieved, causing the pole piece 10a to stand up by the recovering power of the spring 39 to become perpendicular to the magnetic plate 9 and the flat coil 11 (as shown in FIG. 14). In other words, an appropriate gap is established between the tip of the pole piece 10a and the recording face of the magnetic disk 1 and it is possible to obtain the strength of magnetic field needed to perform recording or erasure.

As described above, in the third embodiment the pole piece 10a is folded up when the disk cassette 22 is inserted. The pole piece 10a is then stood upright when the insertion has been completed and it is possible to maintain the smallest gap necessary.

As explained in detail above, in the present invention, by making it possible for the pole piece 10a to rotate, it is possible to choose the distance between the pole piece 10a and the magneto-optical disk 1 in response to whether or not the external magnetic field generating device is to be used. Because of this, excellent performance is displayed, with no lowering of efficiency in recording on magnetic disks.

Furthermore, the inversion of the direction of the magnetic field generated is accomplished by reversing the direction of the electric current flowing through it.

What is claimed is:

1. An external magnetic field generating device, comprising:
   a magnetic plate having a face;
   a pole piece connected to said face of said magnetic plate; and
   a wound, electrically conductive coil having a first side, a second side, and a thickness between said first and second sides, said first side being in contact with said face of said magnetic plate, said coil being wound generally flatly surrounding said pole piece such that said coil extends in a radial direction, said coil generating a magnetic field through said pole piece when an electric current passes through said coil, said second side of said coil being spaced from said magnetic plate by said thickness of said coil;
   wherein a portion of said pole piece projects beyond said second face of said coil;
   whereby said pole piece can be inserted into an opening which is sufficiently small that it does not permit insertion of said coil.

2. An external magnetic field generating device as set forth in claim 1, wherein said pole piece is fixed to said magnetic plate and attached so as to be disposed substantially perpendicularly to said face of said magnetic plate.

3. An external magnetic field generating device as set forth in claim 1 wherein said pole piece is pivotably mounted to said magnetic plate such that it can rotate about an axis which is parallel to said face of said magnetic plate.

4. An external magnetic field generating device as set forth in claim 1, further comprising:
   a resilient member which holds said pole piece at a specified angle relative to said face of said magnetic plate, said resilient member retaining said pole piece in position with a holding force, and
   a guide plate disposed at an end of said pole piece and shaped such that said pole piece can be pivoted so as to be parallel with said face of said magnetic plate when a force is applied which is sufficiently large to overcome said holding force of said resilient member, which has a component which is parallel to said second face of said coil, and which is applied such that it has a force component extending in a direction towards said face of said magnetic plate.

5. An external magnetic field generating device as set forth in claim 1, further comprising:
   a bracket member attached to said face of said magnetic plate; said pole piece being pivotably mounted to said bracket.

6. An external magnetic field generating device as set forth in claim 5, wherein said bracket is formed of a magnetic material and forms part of a magnetic flux which passes through said pole piece.

7. An external magnetic field generating device as set forth in claim 5, wherein said pole piece has a surface which is slanted with respect to said face of said magnetic plate when said pole piece is in said first position.

8. An external magnetic field generating device as set forth in claim 5, wherein said pole piece comprises a first strip and a second strip which are inclined with each other and which are joined together, and said second strip is in contact with said bracket when said pole piece is in said first position.

9. An external magnetic field generating device according to claim 1, wherein said magnetic plate is generally flat.

10. An external magnetic field generating device, comprising:
    a magnetic plate having a face;
    a pole piece connected to said face of the said magnetic plate; and
    a wound, electrically conductive coil which is in contact with said face of said magnetic plate, said coil being wound generally flatly surrounding said pole piece such that said coil extends in a radial direction, said coil generating a magnetic field through said pole piece when an electric current passes through said coil, said coil extending from said magnetic plate;
    wherein said pole piece is connected so as to be movable between a first position, in which a portion of said pole piece projects from said magnetic plate beyond said coil, and a second position, wherein said portion of said pole piece is restricted such that it is closer to said magnetic plate;
    whereby said pole piece can be inserted into an opening which is sufficiently small that it does not permit insertion of said coil.

11. An external magnetic field generating device according to claim 10, wherein said magnetic plate is generally flat.

* * * * *